(12) United States Patent
Koch

(10) Patent No.: US 8,671,191 B2
(45) Date of Patent: *Mar. 11, 2014

(54) INSTALLATION SYSTEM FOR DEMAND RESPONSE RESOURCES

(75) Inventor: Edward Koch, San Rafael, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/364,612

(22) Filed: Feb. 2, 2012

(65) Prior Publication Data

US 2012/0136915 A1    May 31, 2012

Related U.S. Application Data

(63) Continuation-in-part of application No. 13/019,943, filed on Feb. 2, 2011, which is a continuation-in-part of application No. 12/834,841, filed on Jul. 12, 2010.

(60) Provisional application No. 61/301,123, filed on Feb. 3, 2010, provisional application No. 61/271,084, filed on Jul. 17, 2009.

(51) Int. Cl.
    *G05F 5/00* (2006.01)

(52) U.S. Cl.
    USPC ............ 709/224; 709/202; 705/412; 370/319

(58) Field of Classification Search
    USPC ............ 709/224; 705/412; 205/412; 370/319
    See application file for complete search history.

(56) References Cited

U.S. PATENT DOCUMENTS

| | | | |
|---|---|---|---|
| 4,110,827 A | 8/1978 | Shavit | |
| 4,130,874 A | 12/1978 | Pai | |
| 4,153,936 A * | 5/1979 | Schmitz et al. | 700/296 |
| 4,419,667 A | 12/1983 | Gurr et al. | |
| 4,850,010 A | 7/1989 | Stanbury et al. | |
| 4,937,760 A | 6/1990 | Beitel et al. | |
| 5,341,142 A | 8/1994 | Reis et al. | |
| 5,500,561 A | 3/1996 | Wilhelm | |
| 5,566,084 A | 10/1996 | Cmar | |

(Continued)

FOREIGN PATENT DOCUMENTS

| WO | WO 2005033964 | 4/2005 |
|---|---|---|
| WO | WO 2008027455 | 3/2008 |

(Continued)

OTHER PUBLICATIONS https://buildingsolutions.honeywell.com/Cultures/en-US/Markets/Utilities/DemandResponse/, 1page, printed Feb. 3, 2012.

(Continued)

*Primary Examiner* — Tesfay Yohannes
(74) *Attorney, Agent, or Firm* — Seager Tufet & Wickhem LLC.

(57) ABSTRACT

An installation system for demand response resources. The system may invoke a use of an installer portal to increase an efficiency of installing resources for demand response systems. Installation of such resources may incorporate registering a client with a particular customer, configuring the client with parameters, installing the client, confirming that the client is communicating properly with a demand response management system, connecting the client to various components at a resource facility, and confirming that the client sends usage or other data correctly to the demand response management system.

7 Claims, 10 Drawing Sheets

(56) References Cited

U.S. PATENT DOCUMENTS

| | | | |
|---|---|---|---|
| 5,572,438 | A | 11/1996 | Ehlers et al. |
| 5,598,349 | A | 1/1997 | Elliason et al. |
| 5,719,854 | A | 2/1998 | Choudhury et al. |
| 5,822,553 | A * | 10/1998 | Gifford et al. ............... 710/305 |
| 5,892,758 | A | 4/1999 | Argyroudis |
| 6,026,375 | A | 2/2000 | Hall et al. |
| 6,195,367 | B1 | 2/2001 | Jakobik et al. |
| 6,209,018 | B1 | 3/2001 | Ben-Shachar et al. |
| 6,252,950 | B1 | 6/2001 | Duty et al. |
| 6,259,723 | B1 | 7/2001 | Miyashita |
| 6,278,717 | B1 | 8/2001 | Arsenault et al. |
| 6,289,384 | B1 | 9/2001 | Whipple et al. |
| 6,366,926 | B1 | 4/2002 | Pohlmann et al. |
| 6,446,136 | B1 | 9/2002 | Pohlmann et al. |
| 6,519,509 | B1 | 2/2003 | Nierlich et al. |
| 6,529,723 | B1 | 3/2003 | Bentley |
| 6,566,926 | B1 | 5/2003 | Patterson |
| 6,574,581 | B1 | 6/2003 | Bohrer et al. |
| 6,832,249 | B2 | 12/2004 | Ciscon et al. |
| 6,865,685 | B2 | 3/2005 | Hammond et al. |
| 6,985,087 | B2 | 1/2006 | Soliman |
| 7,010,700 | B1 | 3/2006 | Foss et al. |
| 7,039,532 | B2 | 5/2006 | Hunter |
| 7,069,309 | B1 | 6/2006 | Dodrill et al. |
| 7,260,616 | B1 | 8/2007 | Cook |
| 7,333,880 | B2 | 2/2008 | Brewster et al. |
| 7,337,237 | B2 | 2/2008 | Salahshoor et al. |
| 7,346,467 | B2 | 3/2008 | Bohrer et al. |
| 7,392,115 | B2 | 6/2008 | Schindler |
| 7,401,086 | B2 | 7/2008 | Chorafakis et al. |
| 7,528,503 | B2 | 5/2009 | Rognli et al. |
| 7,565,227 | B2 | 7/2009 | Richard et al. |
| 7,650,289 | B2 | 1/2010 | Cooper et al. |
| 7,676,657 | B2 | 3/2010 | Lindholm et al. |
| 7,702,424 | B2 | 4/2010 | Cannon et al. |
| 7,742,953 | B2 | 6/2010 | King et al. |
| 7,775,191 | B2 | 8/2010 | Hou |
| 7,797,009 | B2 | 9/2010 | Kiiskila et al. |
| 7,806,845 | B2 | 10/2010 | Arm et al. |
| 7,845,576 | B2 | 12/2010 | Siddaramanna et al. |
| 7,865,252 | B2 | 1/2011 | Clayton |
| 7,873,441 | B2 | 1/2011 | Synesiou et al. |
| 7,885,718 | B2 | 2/2011 | Yano et al. |
| 7,886,166 | B2 | 2/2011 | Shnekendorf et al. |
| 7,925,384 | B2 | 4/2011 | Huizenga et al. |
| 7,941,528 | B2 | 5/2011 | Hicks, III et al. |
| 7,954,726 | B2 | 6/2011 | Siddaramanna et al. |
| 8,023,410 | B2 | 9/2011 | O'Neill |
| 8,073,558 | B2 | 12/2011 | Koch et al. |
| 8,091,794 | B2 | 1/2012 | Siddaramanna et al. |
| 8,140,658 | B1 * | 3/2012 | Gelvin et al. ............... 709/224 |
| 8,163,276 | B2 | 4/2012 | Hedrick et al. |
| 8,170,774 | B2 | 5/2012 | Forte et al. |
| 8,199,773 | B2 | 6/2012 | Aubin et al. |
| 8,232,745 | B2 | 7/2012 | Chemel et al. |
| 8,260,468 | B2 | 9/2012 | Ippolito et al. |
| 8,260,650 | B2 | 9/2012 | Miller |
| 8,291,243 | B2 | 10/2012 | Castelli et al. |
| 8,327,024 | B2 | 12/2012 | Pattison et al. |
| 8,352,094 | B2 | 1/2013 | Johnson et al. |
| 8,406,937 | B2 | 3/2013 | Verfuerth et al. |
| 8,417,391 | B1 | 4/2013 | Rombouts et al. |
| 2003/0016237 | A1 | 1/2003 | Hickey |
| 2003/0033230 | A1 | 2/2003 | McCall |
| 2003/0233064 | A1 | 12/2003 | Arm et al. |
| 2004/0034484 | A1 | 2/2004 | Solomita, Jr. et al. |
| 2004/0137897 | A1 | 7/2004 | Teixeira |
| 2004/0203649 | A1 | 10/2004 | Cashiola |
| 2005/0027636 | A1 * | 2/2005 | Gilbert et al. ............... 705/37 |
| 2005/0152694 | A1 * | 7/2005 | Chown ............... 398/30 |
| 2005/0172304 | A1 | 8/2005 | Tavares et al. |
| 2005/0194456 | A1 | 9/2005 | Tessier et al. |
| 2005/0229220 | A1 | 10/2005 | Fisher et al. |
| 2005/0262026 | A1 | 11/2005 | Watkins |
| 2007/0005195 | A1 * | 1/2007 | Pasquale et al. ............... 700/295 |
| 2007/0222295 | A1 | 9/2007 | Wareham et al. |
| 2008/0005044 | A1 * | 1/2008 | Benya et al. ............... 705/412 |
| 2008/0011864 | A1 | 1/2008 | Tessier et al. |
| 2008/0046715 | A1 | 2/2008 | Balazs et al. |
| 2008/0167931 | A1 | 7/2008 | Gerstemeier et al. |
| 2008/0177678 | A1 | 7/2008 | Di Martini et al. |
| 2008/0262848 | A1 | 10/2008 | Shienbrood et al. |
| 2008/0272934 | A1 * | 11/2008 | Wang et al. ............... 340/870.11 |
| 2009/0046625 | A1 * | 2/2009 | Diener et al. ............... 370/319 |
| 2009/0092062 | A1 | 4/2009 | Koch et al. |
| 2009/0093916 | A1 * | 4/2009 | Parsonnet et al. ............... 700/286 |
| 2009/0187499 | A1 | 7/2009 | Mulder et al. |
| 2009/0198384 | A1 | 8/2009 | Ahn |
| 2009/0204977 | A1 | 8/2009 | Tavares et al. |
| 2009/0248854 | A1 * | 10/2009 | Conway ............... 709/224 |
| 2009/0271255 | A1 | 10/2009 | Utter et al. |
| 2009/0281674 | A1 * | 11/2009 | Taft ............... 700/286 |
| 2009/0295594 | A1 | 12/2009 | Yoon |
| 2009/0297488 | A1 | 12/2009 | Fraser et al. |
| 2009/0313083 | A1 | 12/2009 | Dillon et al. |
| 2009/0319090 | A1 | 12/2009 | Dillon et al. |
| 2009/0326726 | A1 | 12/2009 | Ippolito et al. |
| 2010/0057480 | A1 | 3/2010 | Arfin et al. |
| 2010/0076615 | A1 | 3/2010 | Daniel et al. |
| 2010/0076835 | A1 * | 3/2010 | Silverman ............... 705/14.33 |
| 2010/0088261 | A1 | 4/2010 | Montalvo |
| 2010/0106342 | A1 | 4/2010 | Ko et al. |
| 2010/0106543 | A1 | 4/2010 | Marti |
| 2010/0114340 | A1 | 5/2010 | Huizenga et al. |
| 2010/0138363 | A1 | 6/2010 | Batterberry et al. |
| 2010/0168924 | A1 | 7/2010 | Tessier et al. |
| 2010/0274377 | A1 | 10/2010 | Kaufman et al. |
| 2010/0283606 | A1 * | 11/2010 | Tsypin et al. ............... 340/540 |
| 2010/0324962 | A1 | 12/2010 | Nesler et al. |
| 2011/0016200 | A1 | 1/2011 | Koch |
| 2011/0040550 | A1 | 2/2011 | Graber et al. |
| 2011/0040666 | A1 | 2/2011 | Crabtree et al. |
| 2011/0046805 | A1 | 2/2011 | Bedros et al. |
| 2011/0093493 | A1 | 4/2011 | Nair et al. |
| 2011/0113068 | A1 | 5/2011 | Ouyang et al. |
| 2011/0125542 | A1 | 5/2011 | Koch |
| 2011/0172836 | A1 | 7/2011 | Boss et al. |
| 2011/0172838 | A1 | 7/2011 | Pai et al. |
| 2011/0196539 | A1 | 8/2011 | Nair et al. |
| 2011/0196546 | A1 | 8/2011 | Muller et al. |
| 2011/0199209 | A1 * | 8/2011 | Siddaramanna et al. ..... 340/540 |
| 2011/0212700 | A1 | 9/2011 | Petite |
| 2011/0231320 | A1 | 9/2011 | Irving |
| 2011/0258049 | A1 | 10/2011 | Ramer et al. |
| 2011/0301774 | A1 | 12/2011 | Koch |
| 2012/0066397 | A1 | 3/2012 | Koch et al. |
| 2012/0066686 | A1 | 3/2012 | Koch |
| 2012/0093141 | A1 | 4/2012 | Imes et al. |
| 2012/0109399 | A1 | 5/2012 | Tran |
| 2012/0173030 | A1 | 7/2012 | Taft |
| 2012/0197456 | A1 | 8/2012 | Walter et al. |
| 2012/0197457 | A1 | 8/2012 | Walter et al. |
| 2012/0197458 | A1 | 8/2012 | Walter et al. |
| 2012/0245968 | A1 | 9/2012 | Beaulieu et al. |
| 2012/0271473 | A1 | 10/2012 | Koch |
| 2012/0277920 | A1 | 11/2012 | Koch |
| 2013/0035992 | A1 | 2/2013 | Silverman |
| 2013/0079931 | A1 | 3/2013 | Wanchoo et al. |

FOREIGN PATENT DOCUMENTS

| | | |
|---|---|---|
| WO | WO 2008027457 | 3/2008 |
| WO | WO 2009/006133 | 1/2009 |
| WO | WO 2009/020606 | 2/2009 |
| WO | WO 2009/023230 | 2/2009 |
| WO | WO 2009/027617 | 3/2009 |
| WO | WO 2009/085610 | 7/2009 |
| WO | WO 2011/065007 | 6/2011 |
| WO | WO 2013/025565 | 2/2013 |
| WO | WO 2013/055551 | 4/2013 |

(56) References Cited

FOREIGN PATENT DOCUMENTS

OTHER PUBLICATIONS

Koch, "The Demand Response Automation Server (DRAS)," Building Performance, http://www.akuacom.com/assets/pdf/ASHRAE_2008_Ed_Koch.pdf, 18 pages, prior to Nov. 17, 2011.
U.S. Appl. No. 13/621,195, filed Sep. 15, 2012.
"Demand Response Measurement and Verification Literature Review," 29 pages, prior to Nov. 29, 2012.
"Smart Demand Response: A Discussion Paper," Energy Networks Association, energyuk, 44 pages, prior to Nov. 29, 2012.
International Search Report for PCT ApplicationSerial No. pct/us2012/058537, International Filing Date Oct. 3, 2012.
U.S. Appl. No. 13/689,551, filed Nov. 29, 2012.
Hunt, "Automated Demand Response System and Advanced End-Use Services Platform," Optimal Technologies, 31, pages, Sep. 24, 2004.
Olson, "New Approaches in Automating and Optimizing Demand Response to Solve Peak Load Management Problems," Building IQ brochure, 8 pages, 2011.
Schisler et al., "The Role of Demand Response in Ancillary Services Markets," IEEE, 3 pages, 2008.
Violette et al., "DRR Valuation and Market Analysis vol. II: Assessing the DRR Benefits and Costs," Summit Blue Consulting, 112 pages, Jan. 6, 2006.
Zaidi et al., "Load Recognition for Automated Demand Response in Microgrids," IEEE, pp. 2436-2439, 2010.
U.S. Appl. No. 12/895,640, filed Sep. 30, 2010.
U.S. Appl. No. 13/272,086, filed Oct. 12, 2011.
Coughlin et al., "Estimating Demand Response Load Impacts: Evaluation of Baseline Load Models for Non-Residential Buildings in California," Lawrence Berkeley National Laboratory, Report No. LBNL-63728, 33 pages, Jan. 2008.
Cruz, "Tutorial on GPU Computing with an Introduction to CUDA," 37 pages, prior to Nov. 17, 2011.
Holmberg, "Facility Interface to the Smart Grid," National Institute of Standards and Technology, 7 pages, printed 2012.
Honeywell, "Automated Demand Response—Southern California Program," 2 pages, printed Aug. 1, 2011.
Honeywell, "The Perfect Response to Peak Events," 4 pages, Nov. 2010.
http://en.wikipedia.org/wiki/Demand_response, "Demand Response," 10 pages, printed Feb. 3, 2012.
https://buildingsolutions.honeywell.com/Cultures/en-US/Markets/Utilities/DemandResponse/, 1page, printed Feb. 3, 2012.
Kiliccote et al., "Findings from Seven Years of Field Performance Data for Automated Demand Response in Commercial Buildings," Lawrence Berkeley National Laboratory, Report No. LBNL-3643E, May 2010.
Kiliccote et al., "Open Automated Demand Response for Small Commercial Buildings," Lawrence Berkeley National Laboratory, Report No. LBNL-2195E, 104 pages, Jul. 2009.
Kiliccote et al., "Open Automated Demand Response Communications in Demand Response for Wholesale Ancillary Services," Lawrence Berkeley National Laboratory, Report No. LBNL-2945E, 13 pages, Nov. 2009.
Koch et al., "Architecture Concepts and Technical Issues for an Open, Interoperable Automated Demand Response Infrastructure," Berkeley National Laboratory, Report No. LBNL-63664, 7 pages, Oct. 2007.
Koch et al., "Direct Versus Facility Centric Load Control for Automated Demand Response," Lawrence Berkeley National Laboratory, Report No. LBNL-2905E, 11 pages, Nov. 2009.
Koch et al., "Scenarios for Consuming Standardized Automated Demand Response Signals," Lawrence Berkeley National Laboratory, Report No. LBNL-1362E, 10 pages, Nov. 2008.
Koch, "The Demand Response Automation Server (DRAS)," Building Performance, http://www.akuacom.conilassets/pdf/ASHRAE_2008_Ed_Koch.pdf, 18 pages, prior to Nov. 17, 2011.
Piette et al., "Automated Critical Peak Pricing Field Tests: 2006 Pilot Program Description and Results," Berkeley National Laboratory, Report No. LBNL-62218, 67 pages, Aug. 2007.
Piette et al., "Automated Critical Peak Pricing Field Tests: Program Description and Results," Lawrence Berkeley National Laboratory, Report No. LBNL-59351, Apr. 2006.
Piette et al., "Design and Implementation of an Open, Interoperable Automated Demand Response Infrastructure," Berkeley National Laboratory, Report No. LBNL-63665, 6 pages, Oct. 2007.
Piette et al., "Findings From the 2004 Fully Automated Demand Response Tests in Large Facilities," Lawrence Berkeley National Laboratory, Report No. LBNL-58178, 197 pages, Sep. 2005.
Piette et al., "Linking Continuous Energy Management and Open Automated Demand Response," Lawrence Berkeley National Laboratory, Report No. LBNL-1361E, 9 pages, Nov. 2008.
Piette et al., "Open Automated Demand Response Communications Specification," Version 1.0, CEC-500-2009-063, 214 pages, Apr. 2009.
Piette et al., "Participation through Automation: Fully Automated Critical Peak Pricing in Commercial Buildings," Berkeley National Laboratory, Report No. LBNL-60614, 14 pages, Aug. 13-18, 2006.
Watson et al., "Machine to Machine (M2M) Technology in Demand Responsive Commercial Buildings," Berkeley National Laboratory, Report No. LBNL-55087, 18 pages, Aug. 2004.
Yin et al., "Auto-DR and Pre-Cooling of Buildings at Tri-City Corporate Center," Lawrence Berkeley National Laboratory, Report No. LBNL-3348, 140 pages, Nov. 2008.
Abdullah et al., "Demand-Side Energy Management Performed Using Direct Feedback via Mobile Systems: Enables Utilities to Deploy Consumer Based Demand Response Programs," 2010 IEEE International Energy Conference and Exhibition, pp. 172-177, 2010.
European Search Report for Related Application No. EP 12169650.4, Dated Nov. 22, 2012.

* cited by examiner

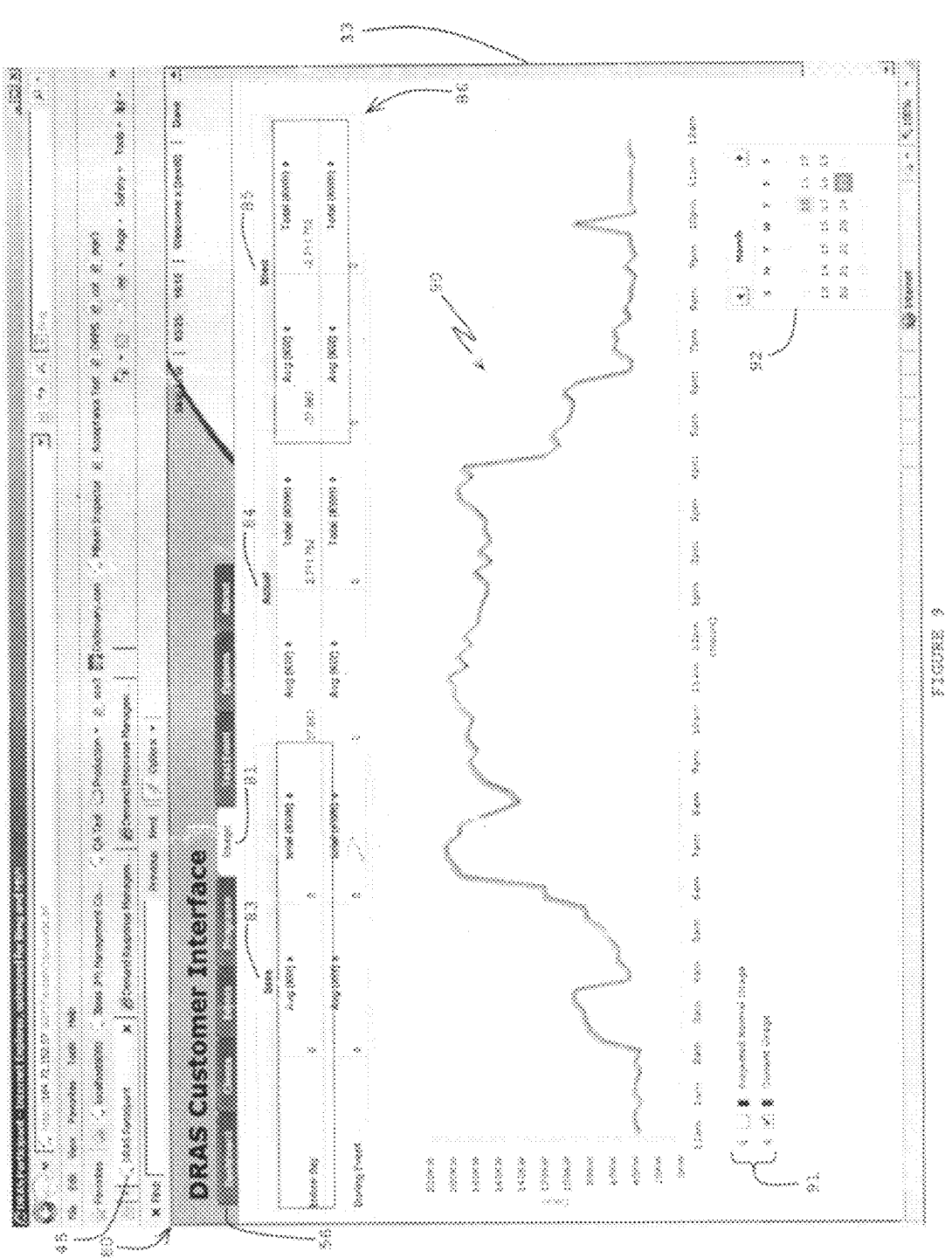

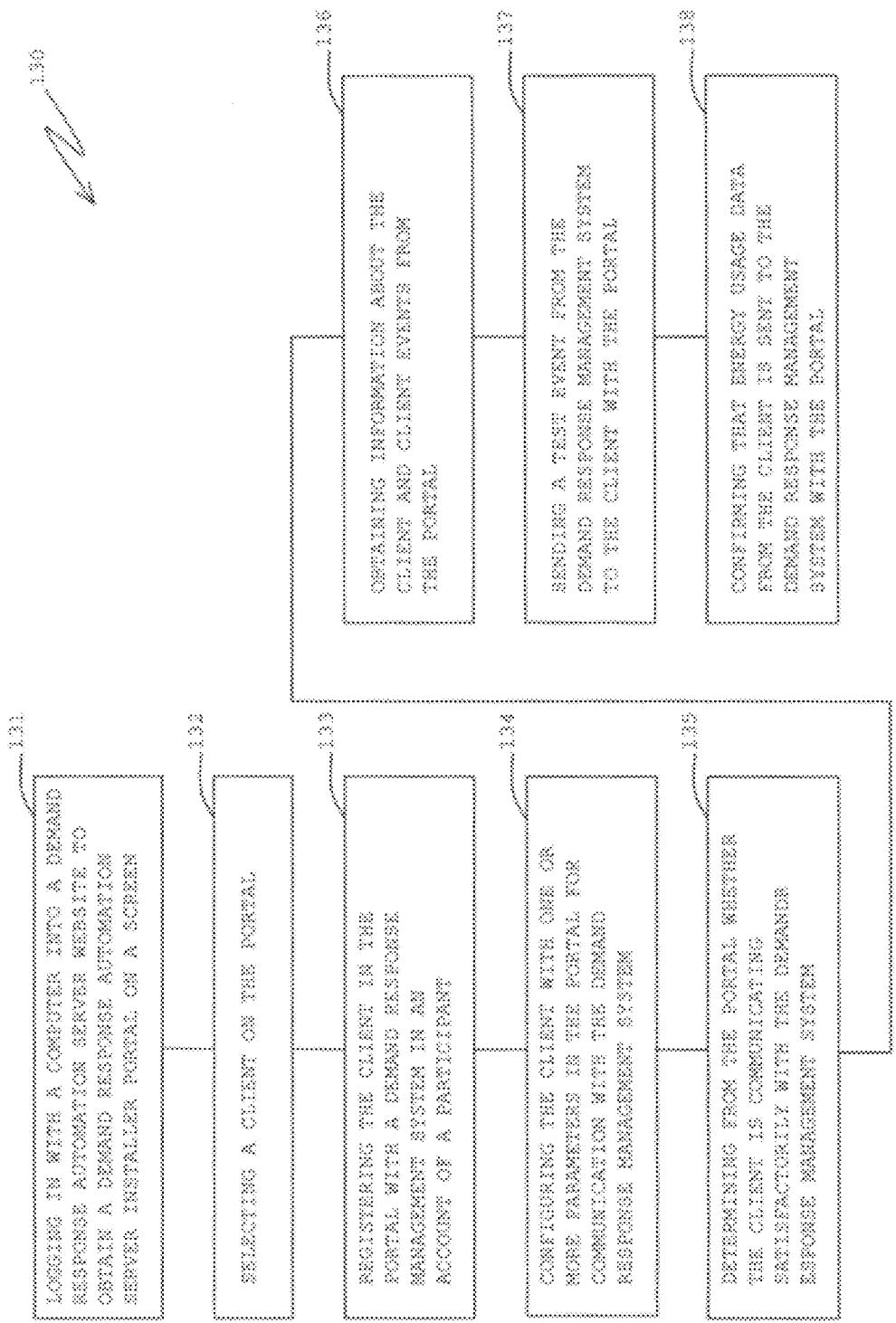

INSTALLATION SYSTEM FOR DEMAND RESPONSE RESOURCES

This application is a continuation-in-part of U.S. patent application Ser. No. 13/019,943, filed Feb. 2, 2011, entitled "A Demand Response Management System", which claims the benefit of U.S. Provisional Patent Application No. 61/301,123, filed Feb. 3, 2010, and entitled "Demand Response Management System". U.S. patent application Ser. No. 13/019,943, filed Feb. 2, 2011, is hereby incorporated by reference. U.S. Provisional Patent Application No. 61/301,123, filed Feb. 3, 2010, is hereby incorporated by reference.

This application is a continuation-in-part of U.S. patent application Ser. No. 13/019,943, filed Feb. 2, 2011, entitled "A Demand Response Management System", which is a continuation-in-part of U.S. patent application Ser. No. 12/834,841, filed Jul. 12, 2010, and entitled "A System for Providing Demand Response Services", which claims the benefit of U.S. Provisional Patent Application No. 61/271,084, filed Jul. 17, 2009. U.S. patent application Ser. No. 12/834,841, filed Jul. 12, 2010, is hereby incorporated by reference. U.S. Provisional Patent Application No. 61/271,084, filed Jul. 17, 2009, is hereby incorporated by reference.

BACKGROUND

The present disclosure pertains to utility resources and particularly to assessment and distribution of the resources. More particularly, the disclosure pertains to beneficial management of resources and their loads.

SUMMARY

The disclosure reveals a use of an installer portal to increase an efficiency of installing resources for demand response systems. Installation of such resources may incorporate registering a client with a particular customer, configuring the client with parameters, installing the client, confirming that the client is communicating properly with a demand response management system, connecting the client to various components at a resource facility, and confirming that the client sends usage or other data correctly to the demand response management system.

BRIEF DESCRIPTION OF THE DRAWING

FIG. 9 is a diagram of a screen print showing a graph of usage data sent by a client to a demand response management system; and FIG. 10 is a diagram of an approach for installing a component in a demand response system.

DESCRIPTION

Figure 1:
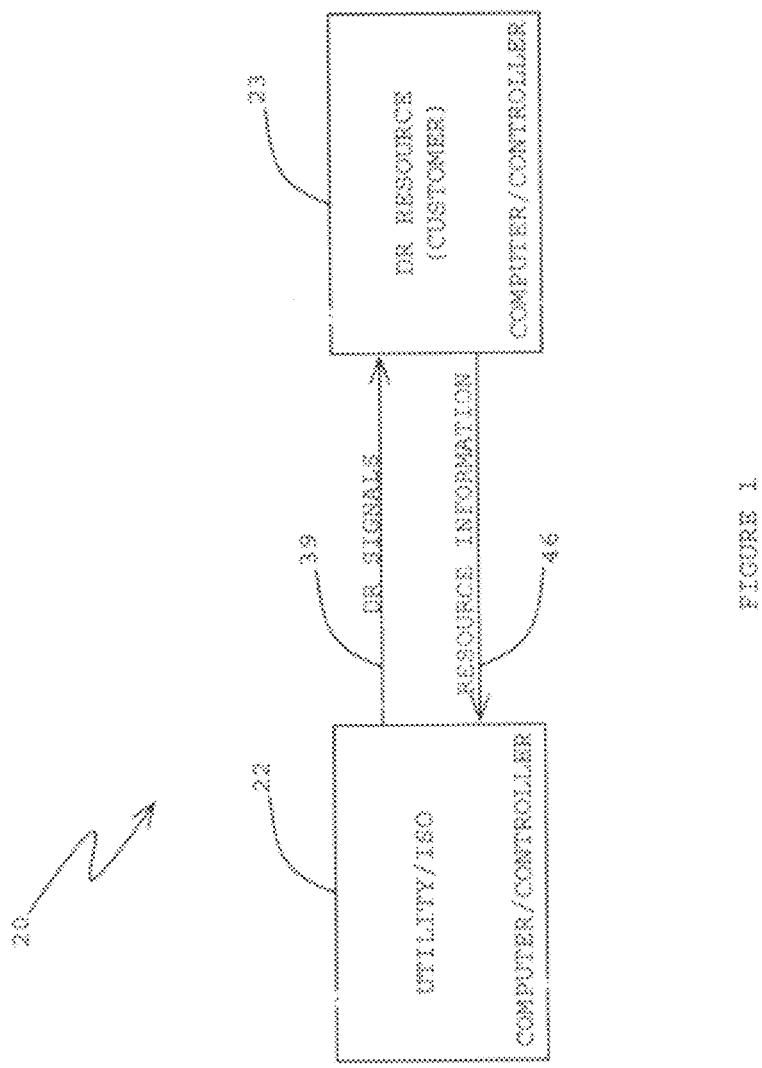
FIG. 1 is a diagram of an example demand response system.

An effective resource is especially critical when communities are confronted with a scarcity of a resource in question. It may be noted that "resource" is a term which may have several senses or meanings. "Resource" may refer to energy, commodity, product, load, and so on. In another sense or meaning, "resource" such as a demand response (DR) resource may refer to a customer, user, participant, facility, and so on. In the first mentioned sense, it may refer to electricity, water, gas and natural resources such as oil. A definition of resource may be extended to include such things such as water quality and air quality. In this regard, adequate water quality and air quality appear necessary to support a self-sustaining environment.

Resource management, in several senses, may be necessary so that systems can optimize the use of a limited resource. Currently, there are various systems for managing resources in various environments such as buildings, apartments, industrial facilities, and computing systems.

One mechanism that might be used to encourage customers to reduce demand and thereby reduce the peak demand for electricity may be referred to as demand response. Demand response may refer to management of the demand by customers in response to supply conditions. For example, electricity customers may reduce their consumption at critical times and/or costs in response to market prices. These customers may be regarded as DR resources.

DR programs may require that a utility and/or independent service operator (ISO) deliver DR signals to customers or participants via a communications channel. The programs may relate to a distribution of resources such as, but not limited to, electricity, water and natural gas.

DR signals may incorporate business level information, such as prices, reliability and shed levels. At some point, from the utility/ISO to loads in a facility, the business level information sent by the utility/ISO should be processed and used to execute a DR strategy and program for the facility.

DR programs may take many forms. They may differ from normal rates and tariffs in that the DR programs are designed to allow the utility/ISO take specific actions to influence the load profiles of facilities that participate in the DR programs at peak consumption times or periods on a grid. The peak consumption periods may cause critical grid reliability issues which should be addressed, but they may also trigger economic factors where the price of electricity or other power commodity reaches a critical level which may be ameliorated by reducing the overall consumption on the grid during those periods. The critical periods, in which the utility/ISO needs to influence a load profile of a facility, may be referred to as DR events.

A manner in which a utility/ISO may influence a load profile of a facility is to send out a DR signal which is specific to the DR event. DR signals may contain information related to businesses, controlling loads, and so on. There may be an automated DR where the DR signals that are sent out by the utility/ISO are responded to in an automated fashion. Loads within a facility may ultimately be affected by DR events via DR signals to which the facility acts upon or responds. The term "facility" may refer to virtually any location in which there are loads influenced by DR events. A place where there are such loads may be regarded as a "DR resource". The term "utility" may be used in a general sense to refer to a utility, independent system operator, service provider, and the like.

To provide a context for an aggregation approach, the present disclosure reveals an implementation of DR signals in a demand response arrangement 20 on a diagram of FIG. 1. System 20 and associated software may be effected and operated with one or more computers/controllers (controllers) 22, 23 and respective connections. The arrangement may be a system that is used by utilities/ISO's to manage the operation of DR programs. A focus of the arrangement may be on the operational aspects of managing the selection, signaling and monitoring of the DR resources that are participating in DR programs. The arrangement may be specifically designed to manage operations of automated DR programs.

There may be various types of interactions that might occur between the utility/ISO and a DR resource as part of a DR program. FIG. 1 is a diagram of an example interaction between a utility/ISO 22 and a DR resource (customer) 23. There may be DR signals 39 going from utility/ISO 22 to DR resource 23. There may be DR resource information 46, such as load measurements, going from DR resource 23 to utility/ISO 22.

Terms such as customer, client, user, participant, DR resource, and like terms, may be used, interchangeably or distinct from one another, depending on a context of a pertinent portion of a description or a claim.

A description of DR signals 39 may be noted. At a high level, there may often be some sort of grid condition, be it economic or grid reliability in nature, which triggers a so-called DR event that requires some sort of interaction between the utility/ISO 22 and its customer 23. This interaction may eventually trigger some sort of load control taking place at a customer's facility. The interaction between the utility/ISO 22 and the customer 23 may be mediated by DR signals 39 and DR resource signals 46, i.e., information such as measurements. Signals 39 and 46 may represent communications between utility/ISO 22, and the DR resource or customer 23. Information contained within DR signals 39 may dictate where much of the decision-making takes place relative to, for example, in how the initial grid condition, which triggered the DR event, results in the eventual load control.

A computer or controller may incorporate one or more inputs, a processor, a user interface incorporating a keyboard, a display and a touch screen, a memory, external connections such as an internet, one or more outputs, and so forth. The computer or controller may be utilized with virtually all items in and pertinent to FIGS. 1-9.

Automated demand response (ADR) programs may be used in a number of different customer market segments ranging from large commercial and industrial to small commercial and residential areas. The number of small commercial facilities may typically outnumber the larger commercial and industrial facilities by an order of magnitude. In addition, the large commercial and industrial facilities may typically have a dedicated staff and a larger budget for installing the equipment necessary to participate in ADR programs. What may be needed is an approach and system to simplify the installation process and make it more affordable and easier to use the system and participate in an ADR program.

Figure 2:
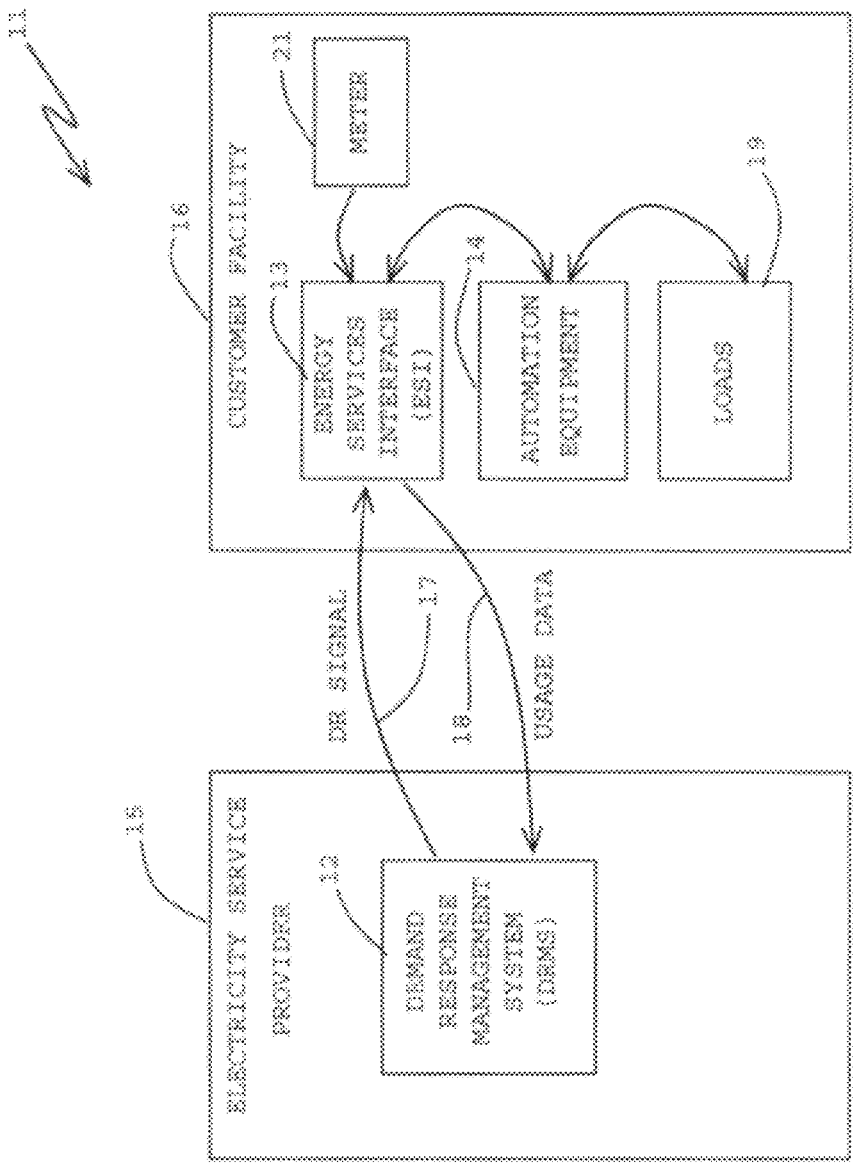
FIG. 2 is a diagram of a system utilizing an automated demand response program.

FIG. 2 is a diagram of an ADR 11. ADR 11 may entail major components such as a demand response management system (DRMS) 12, an energy services interface (ESI) 13, automation equipment 14 and metering equipment 21.

The demand response management system 12 may be used by the electricity service provider 15 (i.e., a utility, independent service operator, or aggregator) to interact with a customer's automation equipment 14 of a customer facility 16 and send the automation equipment so-called "DR signals" 17. An example of a demand response management system may be described in patent application Ser. No. 13/019,943, filed Feb. 2, 2011, which is hereby incorporated by reference.

The energy services interface 13 at the customer's facility 16 may interact with the DRMS 12 in order to receive demand response signals 17 so that automation equipment can intelligibly receive them and send back electrical usage data (e.g., meter data) which are put in a form so that DRMS 12 can intelligibly receive them.

Automation equipment 14 may control customer's loads 19 in response to receiving DR signals 17, via ESI 13, from the DRMS 12. Metering equipment 21 may be used for measuring the usage data. The usage data from meter 21 may be put in a form of meter or usage data 18, via ESI 13, so that DRMS 12 can intelligibly receive them.

An installer referred to herein may be the person responsible for installing the ESI 13 in a customer's facility 16 and connecting ESI 13 to the automation equipment 14 within facility 16 so that the facility can respond to DR signals 17 and send usage data 18 back to the DRMS 12 of provider 15. In general, the functions of receiving the DR signals 17 and returning the usage data 18 in the ESI 13 may be decoupled operations and be implemented in separate devices. The separate devices may be considered to be part of ESI 13.

The present disclosure may be primarily concerned with simplifying the tasks associated with installing the ESI 13. In general, the tasks may need to be performed in order to install an ESI 13 and insure that everything is operating properly. The tasks may incorporate the following items: 1) Register ESI 13 with a particular customer within DRMS 12; 2) Configure ESI 13 with appropriate communication parameters such as security credentials so that ESI 13 can communicate with DRMS 12; 3) Install ESI 13 within the customer's facility 16 and confirm that ESI is communicating properly with DRMS 12; 4) Connect ESI 13 to the customer's automation equipment 14; 5) Connect ESI 13 to the customer's meter 21; 6) Send test DR signals 17 from DRMS 12 to ESI 13; and 7) Confirm that usage or meter data 18 is being sent correctly from ESI 13 to DRMS 12.

In many deployments of ADR tasks, item 1), register ESI 13 with a particular customer within DRMS 12, and item 6), send test DR signals 17 from DRMS 12 to ESI 13, may be performed by an operator of DRMS 12 and need to be scheduled and coordinated with the installer, or vice versa. As the number of customer facilities grows, like that of facility 16, this approach may become burdensome and ideally all the above tasks might be done without the need to coordinate time between various parties.

An approach or solution described herein may simplify the installation process by providing a web-based installer portal with screen print presentations 40-44 in which virtually all of the tasks listed above may be performed by the installer alone without a need to coordinate with other individuals.

Task 1), registering ESI 13 with a particular customer within DRMS 12, and task 2), configuring ESI 13 with appropriate communication parameters, may be performed during a manufacturing of the ESI 13 before it is delivered and installed at the customer site 16; however, for the sake of completeness, the ESI 13 may be supported in the installer's portal presentations 40-44 shown in FIGS. 4-8 to provide flexibility in the installation process.

One may note that certain items of tasks 1-7 listed above may be portrayed in the screen shots 27-33 shown in FIGS. 3-9, respectively, and may be performed in conjunction with the DRMS 12 interfacing with the ESI 13. One may note that in the screen shots 27-33 of FIGS. 3-9, respectively, ESI 13 may be regarded as a "client".

Figure 3:
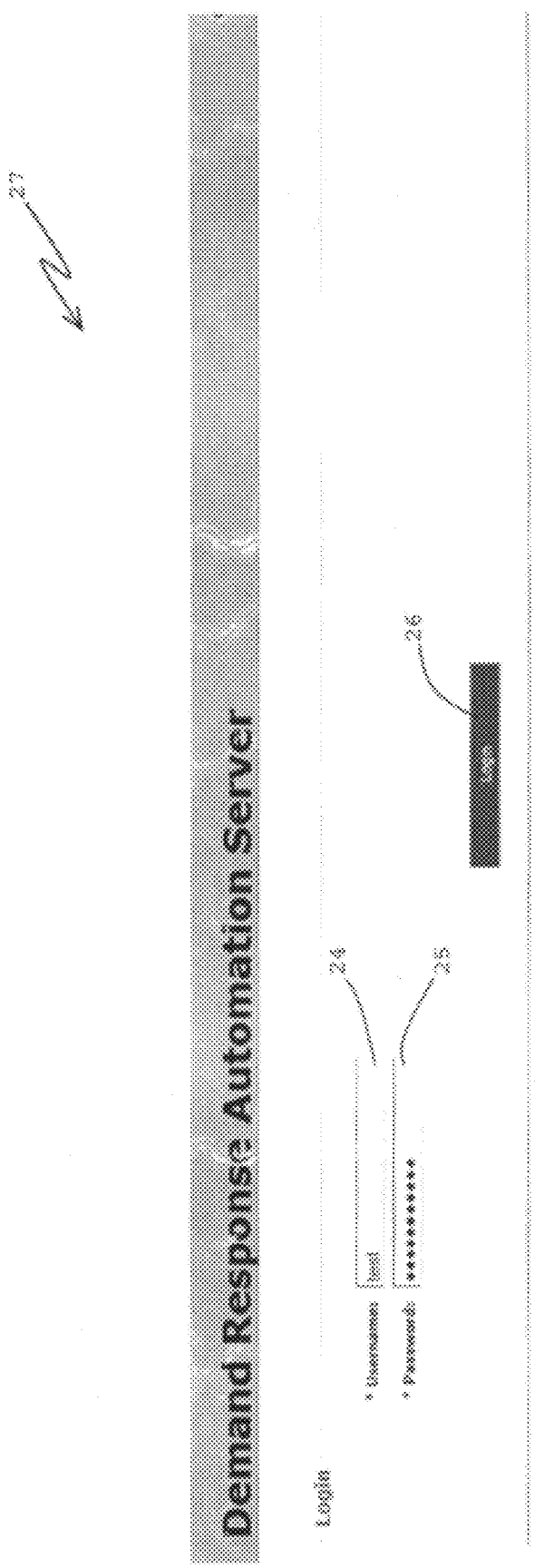
FIG. 3 is a diagram of a screen print showing an example of a login at a demand response automation server for obtaining an installer portal.

FIG. 3 is a diagram of a screen print 27 showing an example installer log-in at a demand response automation server (DRAS) page for getting to a DRAS installer portal. In this example, the installer may log into the participant's account so that by default virtually all subsequent actions are done with respect to the participant whose account which the installer has logged into.

The ESI 13 used by the installer to perform the tasks described herein may be implemented as a web-based portal that is integrated with DRMS 12. The installer may need a user name 24 and password 25 entered in the appropriate places as shown by screen print 27, which would allow the installer to securely log into a demand response automation server website by then clicking on a login button 26. The website may be used to perform the tasks listed above.

Figure 4:
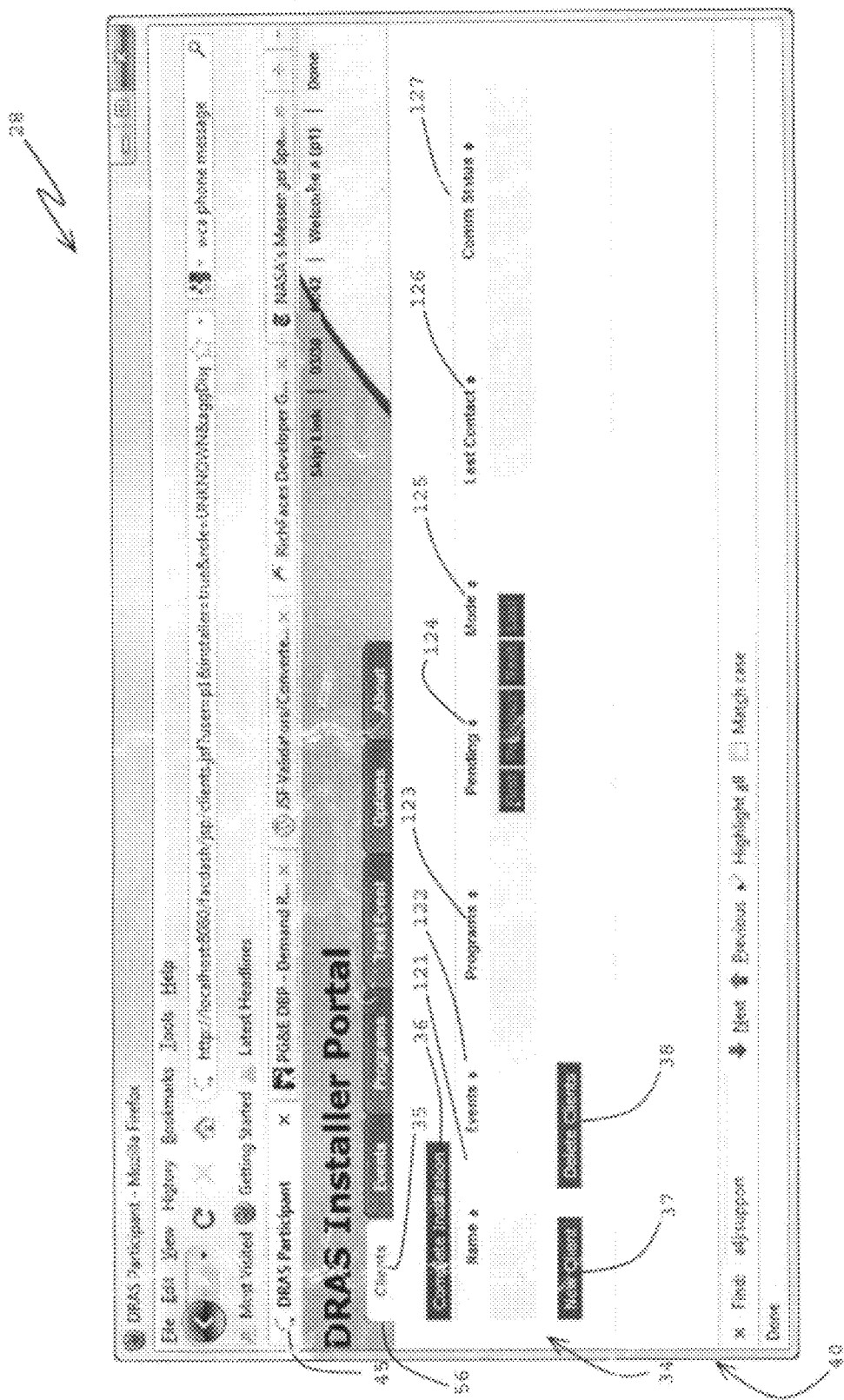
FIG. 4 is a diagram of a screen print showing an example page in the portal for creating a client.

FIG. 4 is a diagram of a screen print 28 showing an example page (e.g., a DRAS installer portal) for creating ESI 13 entities (clients) which by default may be linked to the participant of whose account which has been logged into by the installer.

Once the installer is logged in, a DRAS installer portal (40) may be revealed in screen print 28, having a bar where "DRAS Participant" has been selected with a click on (button) selection 45. A button 35, entitled clients, of row or bar 56, may be selected. The DRAS installer portal (presentation 40) with a table 34 may appear as shown in screen print 28. Table 34 may have headings of name 121, events 122, programs 123, pending 124, mode 125, last connect 126 and comm. status 127. A selection of buttons 36, 37 and 38, entitled "Complete Installation", "New Client" and "Delete Clients" may appear on portal (presentation 40). Other items may also appear on the portal.

Figure 5:
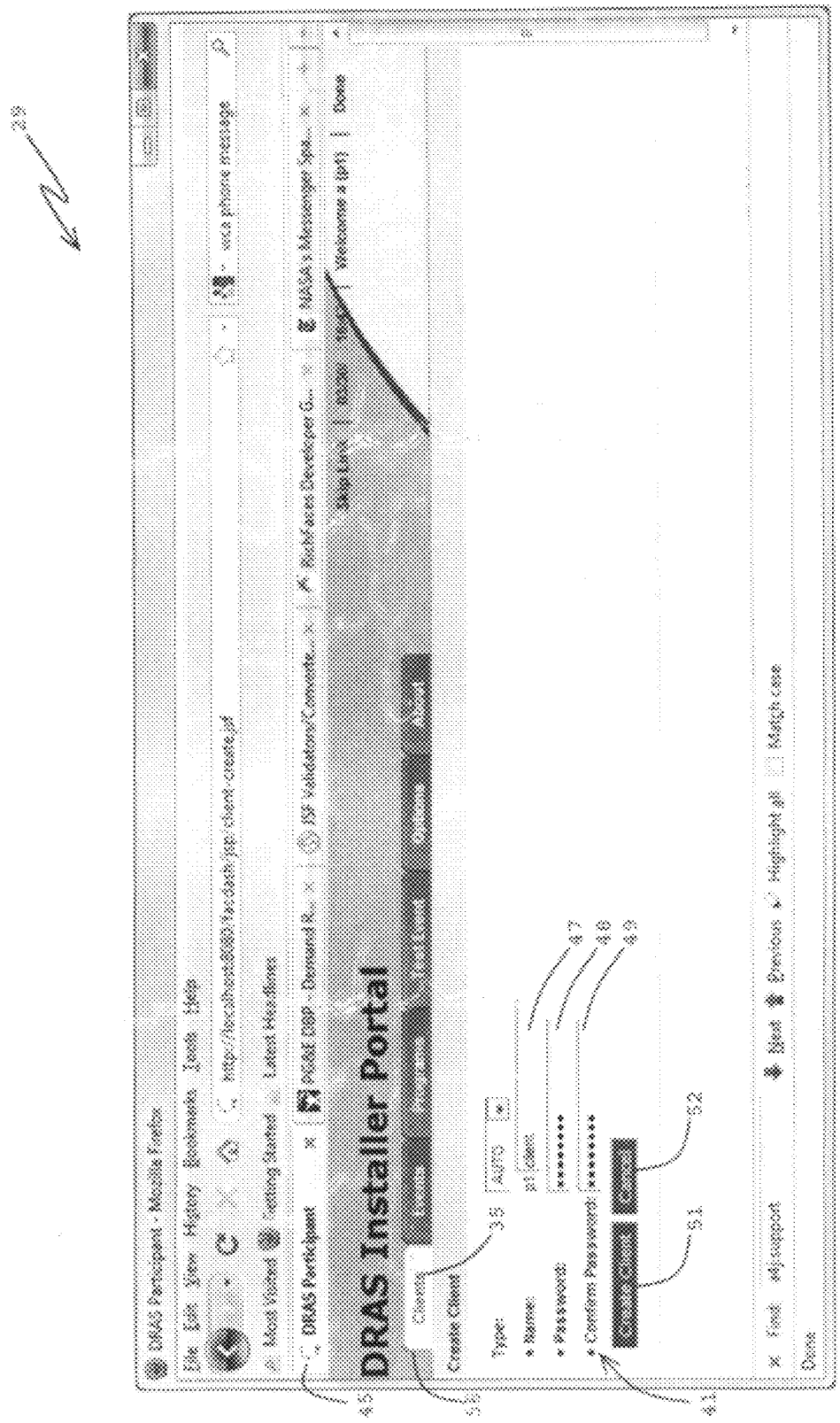
FIG. 5 is a diagram of a screen print showing an example page of the portal for entering parameters for a client.

FIG. 5 is a diagram of a screen print 29 showing an example of entering parameters for ESI 13, specifically the "authentication" parameters necessary for the ESI 13 to communicate with DRMS 12. Here, ESI 13 (client) may be configured.

"New Client" 37 back in portal 40 of FIG. 4, may be clicked on to result in a portal 41 in screen print 29 of FIG. 5 for creating a client. The name of the client may be entered in box 47 of portal 41 in FIG. 5. A password may be entered in box 48 and confirmed in box 49. Button 51 may then be clicked to create the client, or the creating may be canceled by clicking button 52.

Figure 6:
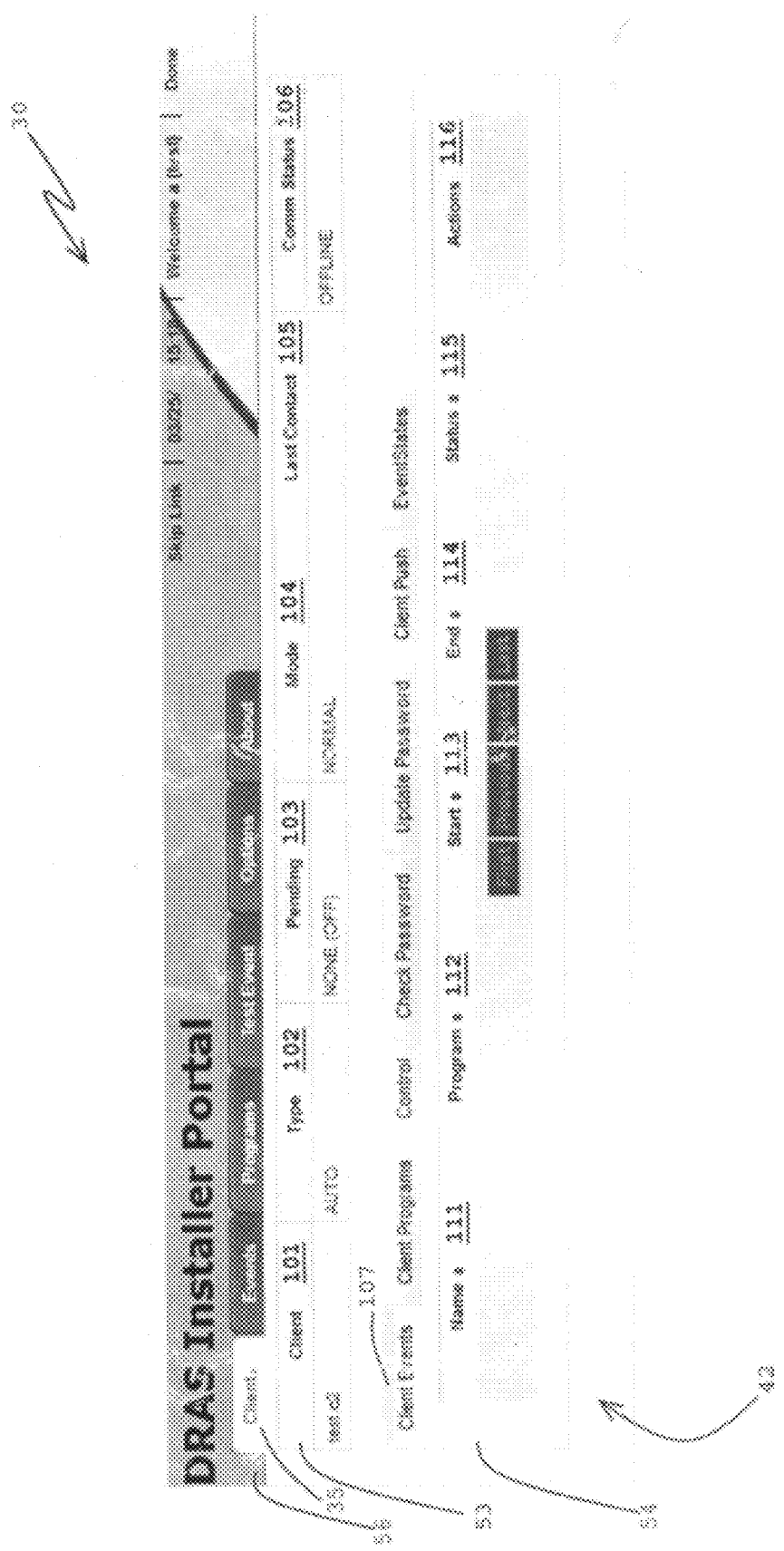
FIG. 6 is a diagram of a screen print an example status page of a portal that may indicate such things as whether a client is on or off line.

FIG. 6 is a diagram of a screen print 30 showing an example of a status page of a portal 42 that may indicate, among other things, whether the ESI 13 is on or off line. This may also indicate whether the ESI 13 is communicating properly with the DRMS 12. Screen print 30 is where ESI 13 (client) communications may be tested.

In portal presentation 42, a bar or row 53 may reveal the client 101, "test.c2", type 102, "AUTO", pending status 103, "NONE (OFF)", mode 104, "NORMAL", last contact 105, no entry, and communication status 106, "OFFLINE". Bar or row 54 may reveal client events 107. Event information indicated may incorporate name 111, program 112, start 113, end 114, status 115 and actions 116. Relevant information may be below or alongside a respective heading.

A function of the present approach may be a providing a single login to install clients. In an installer mode, some functionalities may be filtered out, such as aggregation, contacts sub tab and subsuer tab, to ease an installation.

Figure 7:
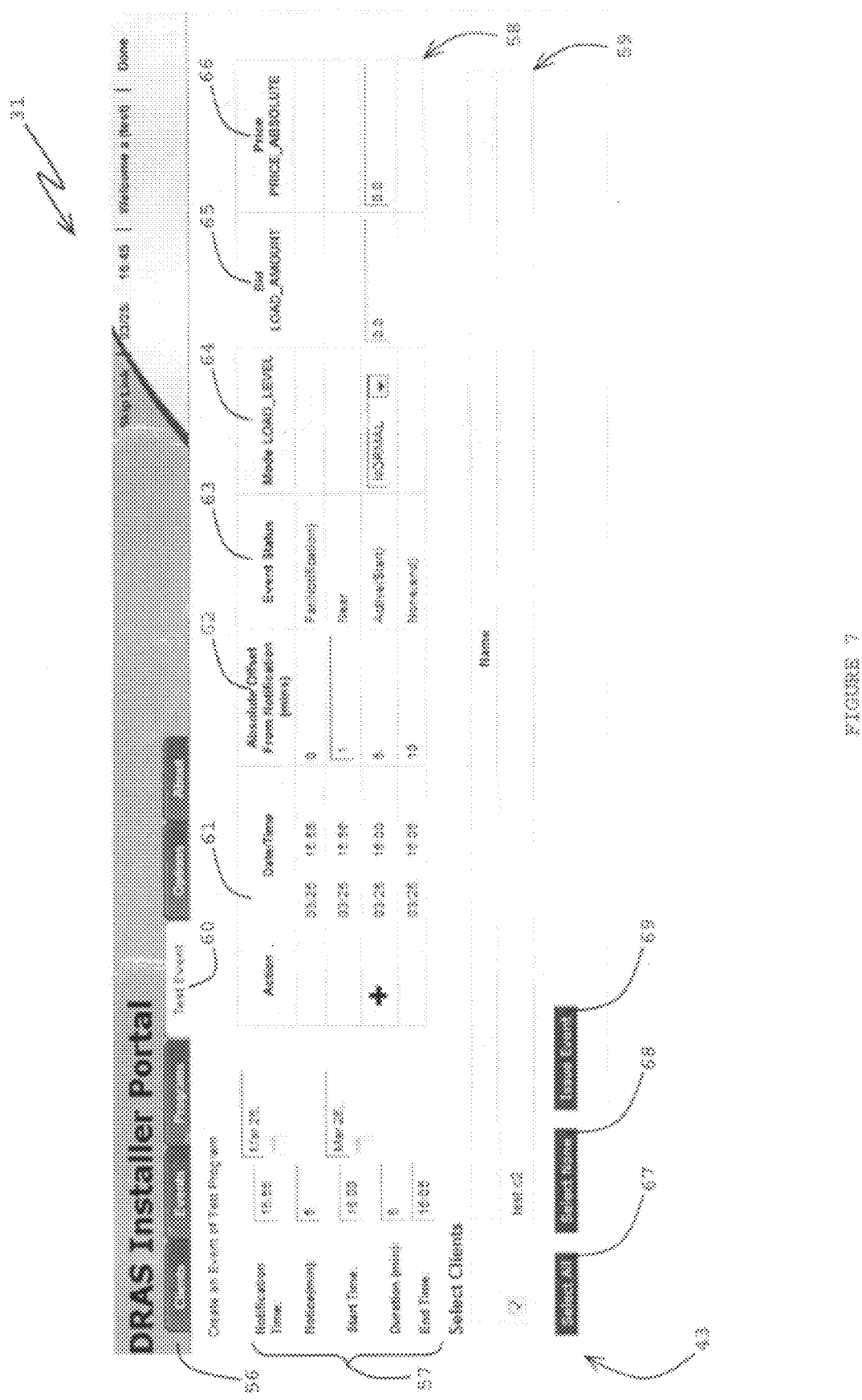
FIG. 7 is a diagram of a screen print showing an example of a test event being sent to a client from a demand response management system.

FIG. 7 is a diagram of a screen print 31 showing an example of how a test event may be sent to the ESI 13 from the DRMS 12. Here is where the installer may send test events.

A portal presentation 43 is revealed in screen print 31. A test event 60 of a bar 56 may be clicked on to reveal a creating an event of a test program in portal 43. A notification time of 15:55 on Mar. 25 with a notice of 5 min. is shown for the event, along with a start time of 16:00 on Mar. 25 having a duration of 5 min. for an end time of 16:05 indicated in area 57.

A table 58 in portal 43 shows column headings 61-66 of action and date/time 61, absolute offset from notification (mins) 62, event status 63, mode load_level 64, bid load_amount 65 and price price_absolute 66.

The first row under the headings 61-66 may respectively show 3/25 15:55, 0, Far(Notification), and three spaces with no entries. The second row may show 03/25 15:56, 1, Near, and three spaces with no entries. The third row may show 03/25 16:00, 5, Active(Start), NORMAL, 0.0 and 0.0. The fourth row may show 03/25 16:05, 10, None(end), and three spaces with no entries.

Below area 57 and table 58 may be a block 59 for a list of select clients by name. A client test.c2 appears to be listed. Other clients may be listed. One of the buttons 67, 68 and 69, entitled select all (clients), select none and issue event, respectively, may be clicked on.

Figure 8:
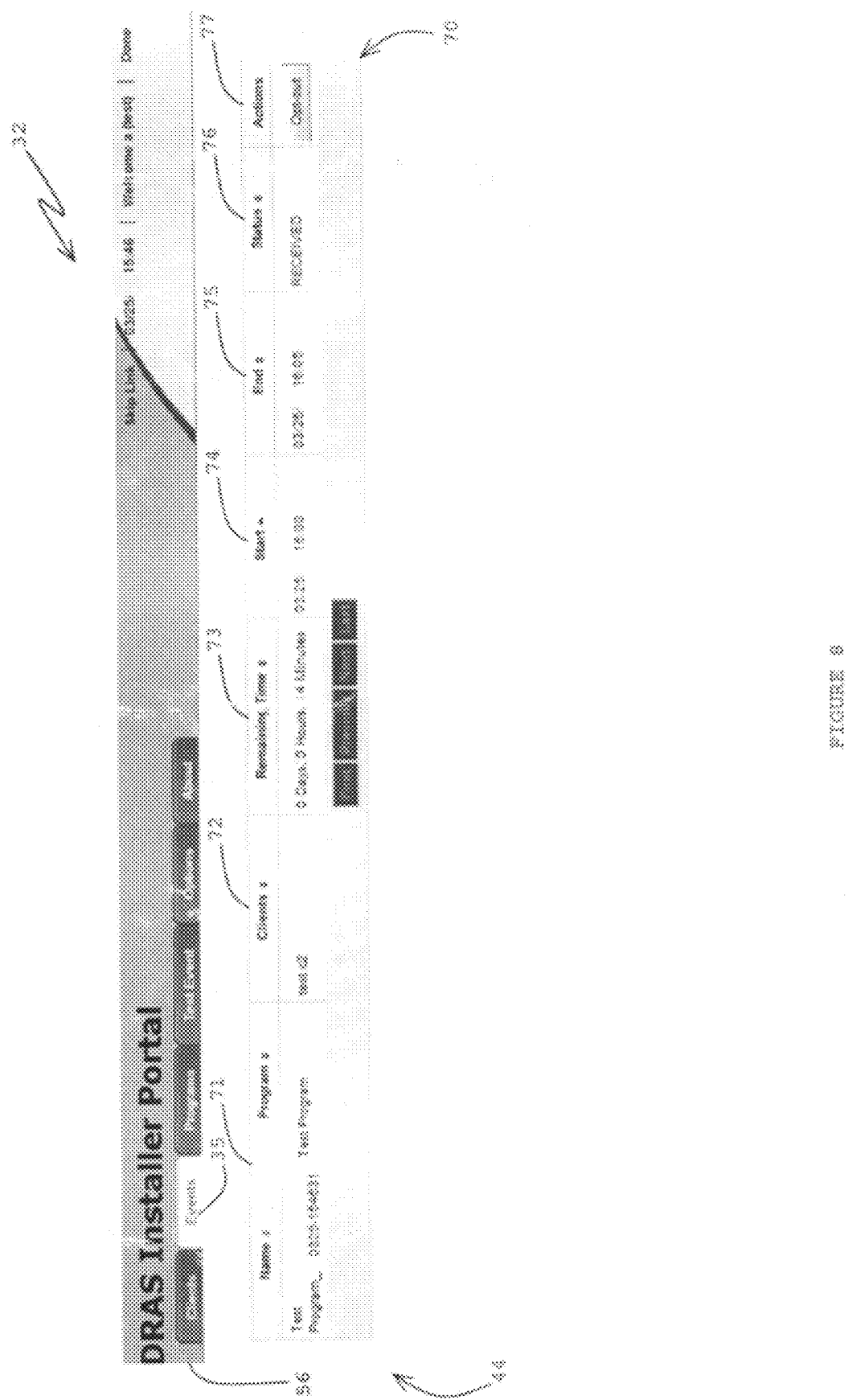
FIG. 8 is a diagram of a screen print showing an example layout for events selected on a bar in the portal.

A portal presentation 44 in screen print 32 of FIG. 8 may reveal a layout for events 35 selected on bar 56. One event revealed for the client list in block 59 of FIG. 7 may be shown in a table 70 under labels 71-77 incorporating name and program 71, clients 72, remaining time 73, start 74, end 75, status 76 and actions 77. The row under the headings 71-77 may show information respectively such as Test Program_ 0325-154831 and Test Program, test.c2, 0 Days, 0 Hours, 14 Minutes, 03/25 16:00, 3/25 16:05, RECEIVED and Opt-out. Test DR signals may be sent.

FIG. 9 is a diagram of a screen print 33 showing a graph which may be used to confirm that the usage or meter data 18 are being sent correctly from the ESI 13 to the DRMS 12. Here is where there may be the testing of usage information conveyance.

Screen print 33 may reveal a DRAS customer interface 80 of 03/25 at 16:15 for the noted client of the preceding installer portal presentations of the previous Figures. A usage button 81 of a bar 56 may be clicked. Headings of base 83, actual 84 and shed 85 of an information box 86 may reveal usage data of the client. Box 86 may incorporate two rows, one for the entire day and a second for during an event, as indicated under the heading of base 83. In each of the rows there may also be indicated Avg (KW) and total (KWH) under each of the headings of base 83, actual 84 and shed 85. In the first row, data may be indicated as 0 (zero) for base 83, 37.663 KW and 2,711.752 KWH for actual 84, and −37.663 KW and −2,711.752 KWH for shed 85. In the second row, for base 83, actual 84 and shed 85, the data entries appear as 0 (zero).

Also in the DRAS customer interface 80 is a graph 90 showing power usage in KW versus a time of the power usage. Legend 91 indicates a graph selection of projected normal usage and current usage. As noted, current usage is selected for graph 90. A calendar 92 indicates a date of the usage. Screen print 33 may merely be one illustrative example of usage by a client (or customer).

To recap, a demand response system may incorporate a facility of a participant and a utility service provider. The facility may incorporate an energy services interface, an energy usage measuring instrument connected to the energy services interface, automation equipment connected to the energy services interface, and one or more energy usage loads connected to the automation equipment. The utility service provider may incorporate a demand response management system connected to the energy services interface. An installer of the energy services interface may log in with a computer into a demand response automation server website to pull up a demand response automation server installer portal on a display screen. The installer may be logged into an account of the participant.

The energy services interface may be selected and created in the portal. The energy services interface may be registered with the demand response management system for the participant. The energy services interface may be configured by entering parameters in the portal to configure the energy services interface necessary for the energy services interface to communicate with the demand response management system. The portal may indicate whether the energy services interface is communicating satisfactorily with the demand response management system. The portal may provide information about the energy services interface and/or events. The portal may enable the installer to have a test event to be sent from the demand response management system to the energy services interface. The portal may enable the installer to confirm data of the meter being sent correctly from the energy services interface to the demand response management system. The portal may reveal energy usage data from the energy services interface.

Virtually all actions by the installer via the demand response automation server installer portal may be performed on behalf of the participant if the installer is logged into the account of the participant.

The energy services interface may be registered with the demand response management system during a manufacturing of the energy services interface. During the manufacturing of the energy services interface, the energy services interface may be configured with one or more parameters for communication with the demand response management system.

FIG. 10 is a diagram of an approach 130 for installing a component in a demand response system. The approach may incorporate more or less steps or symbols, and the order may be different, as approach 130 is just an illustrative example. The approach may incorporate logging in with a computer into a demand response automation server website to obtain a demand response automation server installer portal on a screen in symbol 131, selecting a client on the portal in symbol 132, and registering the client in the portal with a demand response management system in an account of a participant in symbol 133.

The client may be an interface for a demand response resource facility of the participant. One or more tasks for installation of the client may be performed via the portal on behalf of the participant.

Approach 130 may further incorporate configuring the client with one or more parameters in the portal for communication with the demand response management system in symbol 134. The approach may also incorporate determining from the portal whether the client is communicating satisfactorily with the demand response management system in symbol 135.

Approach 130 may further yet incorporate obtaining information about the client and client events from the portal in symbol 136, and sending a test event from the demand response management system to the client with the portal in symbol 137. The approach may further incorporate confirming that energy usage data from the client is sent to the demand response management system with the portal in symbol 138.

An approach for installing an energy services interface in a demand response system, may incorporate providing a web-based installer portal via a computer, creating an energy services interface at the portal, registering the energy services interface with a particular customer within a demand resource management system, during a manufacturing of the energy services interface, and configuring the energy services interface with appropriate communication parameters during the manufacturing of the energy services interface.

An installer may log in at a demand response automation server page to get to the installer portal. The installer may log into an account of a participant so that virtually all actions are performed on behalf of the participant.

The web-based installer portal may be integrated with the demand response management system. The portal may be used to perform tasks for installing the energy services interface.

The energy services interface may be configured via the portal for communication with the demand response management system. The energy services interface may be tested via the portal for communicating properly with the demand response management system. A test event may be sent to the energy services interface from the demand response management system via the portal.

Usage data may be confirmed as being with the portal conveyed correctly from the energy services to the demand response management system. The usage data may be displayed graphically.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:
1. A demand response system comprising:
a facility of a participant; and
a utility service provider; and
wherein:
the facility comprises:
an energy services interface;
an energy usage measuring instrument connected to the energy services interface;
automation equipment connected to the energy services interface; and
one or more energy usage loads connected to the automation equipment;
the utility service provider comprises a demand response management system connected to the energy services interface;
an installer of the energy services interface logs in with a computer into a demand response automation server website to pull up a demand response automation server installer portal on a display screen;
the installer is logged into an account of the participant;
determining from the portal whether the participant is communicating satisfactorily with the demand response management system; and
confirming that energy usage data from the participant is sent to the demand response management system with the portal; and
wherein:
a client is an interface for a demand response resource facility of the participant; and one or more tasks for installation of the client are performed via the portal on behalf of the participant.

2. The system of claim 1, wherein:
the energy services interface is selected and created in the portal;
the energy services interface is registered with the demand response management system for the participant;
the energy services interface is configured by entering parameters in the portal to configure the energy services interface necessary for the energy services interface to communicate with the demand response management system;
the portal indicates whether the energy services interface is communicating satisfactorily with the demand response management system;
the portal provides information about the energy services interface and/or events;
the portal enables the installer to have a test event to be sent from the demand response management system to the energy services interface;
the portal enables the installer to confirm data of the meter being sent correctly from the energy services interface to the demand response management system; and/or
the portal reveals energy usage data from the energy services interface.

3. The system of claim 1, virtually all actions by the installer via the demand response automation server installer portal are performed on behalf of the participant since the installer is logged into the account of the participant.

4. The system of claim 1, wherein:
the energy services interface is registered with the demand response management system during a manufacturing of the energy services interface; and
during the manufacturing of the energy services interface, the energy services interface is configured with one or more parameters for communication with the demand response management system.

5. A method for installing a component in a demand response system, comprising:
logging in with a computer into a demand response automation server website to obtain a demand response automation server installer portal on a screen;
selecting a client on the portal;
registering the client in the portal with a demand response management system in an account of a participant;
configuring the client with one or more parameters in the portal for communication with the demand response management system;
determining from the portal whether the client is communicating satisfactorily with the demand response management system; and
confirming that energy usage data from the client is sent to the demand response management system with the portal; and
wherein:
the client is an interface for a demand response resource facility of the participant; and
one or more tasks for installation of the client are performed via the portal on behalf of the participant; and
wherein:
the client is an interface for a demand response resource facility of the participant; and
one or more tasks for installation of the client are performed via the portal on behalf of the participant.

6. The method of claim 5, further comprising obtaining information about the client and client events from the portal.

7. The method of claim 6, further comprising sending a test event from the demand response management system to the client with the portal.

* * * * *